United States Patent
Swoboda (10) Patent No.: US 9,633,213 B2
(45) Date of Patent: Apr. 25, 2017

(54) SECURE EMULATION LOGIC BETWEEN PAGE ATTRIBUTE TABLE AND TEST INTERFACE

(71) Applicant: TEXAS INSTRUMENTS INCORPORATED, Dallas, TX (US)

(72) Inventor: Gary L. Swoboda, Sugar Land, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 19 days.

(21) Appl. No.: 14/179,765

(22) Filed: Feb. 13, 2014

(65) Prior Publication Data

US 2014/0196154 A1 Jul. 10, 2014
US 2017/0091465 A9 Mar. 30, 2017

Related U.S. Application Data

(62) Division of application No. 11/383,475, filed on May 15, 2006, now abandoned.

(60) Provisional application No. 60/681,494, filed on May 16, 2005, provisional application No. 60/681,427, filed on May 16, 2005.

(51) Int. Cl.
G06F 21/62 (2013.01)
G06F 11/36 (2006.01)

(52) U.S. Cl.
CPC .......... G06F 21/62 (2013.01); G06F 11/3656 (2013.01)

(58) Field of Classification Search
CPC ...... G06F 11/3656; G06F 21/62; G06F 3/067; G06F 3/0665; G06F 3/0659; G06F 3/0613; G06F 3/0689; G06F 21/00; G06F 21/10; G11B 20/00086; G11B 20/0021; H04L 63/0428; H04N 21/4405

See application file for complete search history.

(56) References Cited

U.S. PATENT DOCUMENTS

| 5,293,610 A * | 3/1994 | Schwarz ........................ 711/164 |
| 5,590,354 A * | 12/1996 | Klapproth et al. ............. 714/30 |
| 5,623,627 A * | 4/1997 | Witt ..................... G06F 12/0897 711/122 |
| 5,689,565 A * | 11/1997 | Spies et al. ..................... 713/189 |
| 5,838,897 A * | 11/1998 | Bluhm et al. ................... 714/30 |
| 6,185,732 B1 * | 2/2001 | Mann et al. ................... 717/128 |
| 6,205,560 B1 * | 3/2001 | Hervin et al. ................... 714/34 |
| 6,345,383 B1 * | 2/2002 | Ueki ............................. 717/124 |
| 6,367,032 B1 * | 4/2002 | Kasahara ........................ 714/25 |

(Continued)

*Primary Examiner* — Mano Padmanabhan
*Assistant Examiner* — Jean Edouard
(74) *Attorney, Agent, or Firm* — Lawrence J. Bassuk; Charlie A. Brill; Frank D. Cimino (57) ABSTRACT

The present disclosure describes systems and methods for controlling access to secure debugging and profiling features of a computer system. Some illustrative embodiments include a system that includes a processor, and a memory coupled to the processor (the memory used to store information and an attribute associated with the stored information). At least one bit of the attribute determines a security level, selected from a plurality of security levels, of the stored information associated with the attribute. Asserting at least one other bit of the attribute enables exportation of the stored information from the computer system if the security level of the stored information is higher than at least one other security level of the plurality of security levels.

3 Claims, 6 Drawing Sheets

(56) References Cited

U.S. PATENT DOCUMENTS

| | | | |
|---|---|---|---|
| 6,542,966 B1* | 4/2003 | Crawford | G06F 12/126 711/133 |
| 6,591,378 B1* | 7/2003 | Arends et al. | 714/38.1 |
| 6,622,184 B1* | 9/2003 | Tabe et al. | 710/36 |
| 6,662,314 B1* | 12/2003 | Iwata et al. | 714/42 |
| 6,804,782 B1* | 10/2004 | Qiu | G06F 9/3001 380/30 |
| 6,968,420 B1* | 11/2005 | Giles et al. | 711/103 |
| 7,237,151 B2* | 6/2007 | Swoboda et al. | 714/45 |
| 7,313,730 B1* | 12/2007 | Ryser | 714/30 |
| 7,627,784 B1* | 12/2009 | Allen | G06F 11/3636 714/30 |
| 2001/0016916 A1* | 8/2001 | Mayer | 713/202 |
| 2001/0018736 A1* | 8/2001 | Hashimoto et al. | 713/1 |
| 2003/0005417 A1* | 1/2003 | Gard | G06F 11/3656 717/135 |
| 2003/0061020 A1* | 3/2003 | Michael | G06F 11/2236 703/28 |
| 2003/0140244 A1* | 7/2003 | Dahan | G06F 9/30047 713/190 |
| 2003/0140245 A1* | 7/2003 | Dahan | G06F 9/30047 713/190 |
| 2004/0010702 A1* | 1/2004 | Lewis | 713/194 |
| 2004/0143714 A1* | 7/2004 | Watt | G06F 12/1491 711/163 |
| 2005/0039039 A1* | 2/2005 | Moyer | G06F 21/71 726/22 |
| 2005/0114616 A1* | 5/2005 | Tune | G06F 12/1441 711/163 |
| 2005/0289286 A1* | 12/2005 | Ohwada | G06F 11/3656 711/1 |
| 2005/0289400 A1* | 12/2005 | Kimura | G06F 11/3636 714/45 |

\* cited by examiner

| NS BIT | 0 | 0 | 1 | 1 |
|---|---|---|---|---|
| EMU BIT | 0 | 1 | 0 | 1 |
| SECURE EMULATION STAGE ENABLE | 0 | 1 | 1 | 1 |

0 = DE-ASSERTED
1 = ASSERTED

SECURE EMULATION LOGIC BETWEEN PAGE ATTRIBUTE TABLE AND TEST INTERFACE

CROSS-REFERENCE TO RELATED APPLICATIONS

This Application is a divisional of prior application Ser. No. 11/383,475, filed May 15, 2006, now abandoned;

Which claims the benefit of provisional application Ser. No. 60/681,494, filed May 16, 2005 and entitled "Debug event instructions accesses application in secure mode,"

And also claims the benefit of provisional application Ser. No. 60/681,427, filed May 16, 2005 and entitled "Debugging software-controlled cache coherence," both of which are herein incorporated by reference.

The present application is also related to non-provisional application U.S. patent application Ser. No. 11/383,467; filed May 15, 2006 and entitled "Systems and Methods for Secure Debugging and Profiling of a Computer System," which is also herein incorporated by reference.

BACKGROUND

The increase in the complexity of modern microprocessors has created a comparable increase in the complexity of the tools used to debug and profile such microprocessors. In-circuit emulators have given way to microprocessors with built-in debug and test ports, through which external computer systems, running debug and test software, communicate with the microprocessor to debug problems and profile the performance of software executing on the microprocessor within a target system. But debug and test ports may be used by a malicious user to bypass security measures implemented within a microprocessor. Regardless of whether such security measures are implemented in hardware or software, the debug and test ports can potentially give a malicious user access to secure portions of a computer system that might otherwise be protected from unauthorized access during non-debug and non-test modes of operation.

SUMMARY

The present disclosure describes systems and methods for controlling access to secure debugging and profiling features of a computer system. Some illustrative embodiments include a system that includes a processor, and a memory coupled to the processor (the memory used to store information and an attribute associated with the stored information). At least one bit of the attribute determines a security level, selected from a plurality of security levels, of the stored information associated with the attribute. Asserting at least one other bit of the attribute enables exportation of the stored information from the computer system if the security level of the stored information is higher than at least one other security level of the plurality of security levels.

Other illustrative embodiments include a method that includes receiving a request from a requestor to enable secure testing of a target application executing on a target system, sending an authorization request to the target application, and enabling secure testing of the target application and notifying the requestor that secure testing is allowed, if the target application allows the request.

Yet other illustrative embodiments include an Information carrier medium that includes software that can be executed on a processor to cause the processor to receive a request from a requestor to enable secure testing of a target application executing on a target system; to send an authorization request to the target application; and to enable secure testing of the target application and notifying the requestor that secure testing is allowed, if the target application allows the request.

Still other illustrative embodiments include a method that includes receiving a request for secure test access to a target application executing within a target system, the request received by the target application, attempting to validate the authentication credentials within the request using validation data stored within the target application, and sending a response to the request indicating that secure test access is allowed if the authentication credentials are validated.

Still further illustrative embodiments include an Information carrier medium comprising software that can be executed on a processor to cause the processor to receive a request for secure test access to a target application executing within a target system, the request received by the target application; to attempt to validate the authentication credentials within the request using validation data stored within the target application; and to send a response to the request indicating that secure test access is allowed if the authentication credentials are validated.

Yet further illustrative embodiments include a method that includes receiving a request from a user to securely test a target application, sending a request to a target system to securely test the target application, the request comprising authentication credentials, and receiving test data from the target application if a response is received to the request sent to the target system indicating that test access to the target application is allowed.

Still further illustrative embodiments include an Information carrier medium comprising software that can be executed on a processor to cause the processor to receive a request from a user to securely test a target application; to send a request to a target system to securely test the target application, the request comprising authentication credentials; and to receive test data from the target application if a response is received to the request sent to the target system indicating that test access to the target application is allowed.

Yet further illustrative embodiments include a system for debugging and profiling a computer system that includes a target computer system comprising a processor, wherein an operating system executes on the processor and a target application and a kernel execute within the operating system on the processor, and further comprising a memory coupled to the processor, wherein the target application and a page attribute table are stored in the memory; and a test workstation coupled to the target system, wherein a debug and profiling application executes on the test workstation. The kernel asserts a bit within an entry in the page attribute table, the entry associated with the location in memory where the target application is stored, and the assertion enables the target application to provide test information to the debug and profiling application. The target application is stored in a secure region of memory and executes one the processor in a secure mode.

BRIEF DESCRIPTION OF THE DRAWINGS

For a detailed description of the illustrative embodiments of the invention, reference will now be made to the accompanying drawings in which.

NOTATION AND NOMENCLATURE

Certain terms are used throughout the following discussion and claims to refer to particular system components. This document does not intend to distinguish between components that differ in name but not function. In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

Additionally, the term "system" refers to a collection of two or more parts and may be used to refer to an electronic system such as a computer system or a portion of a computer system. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
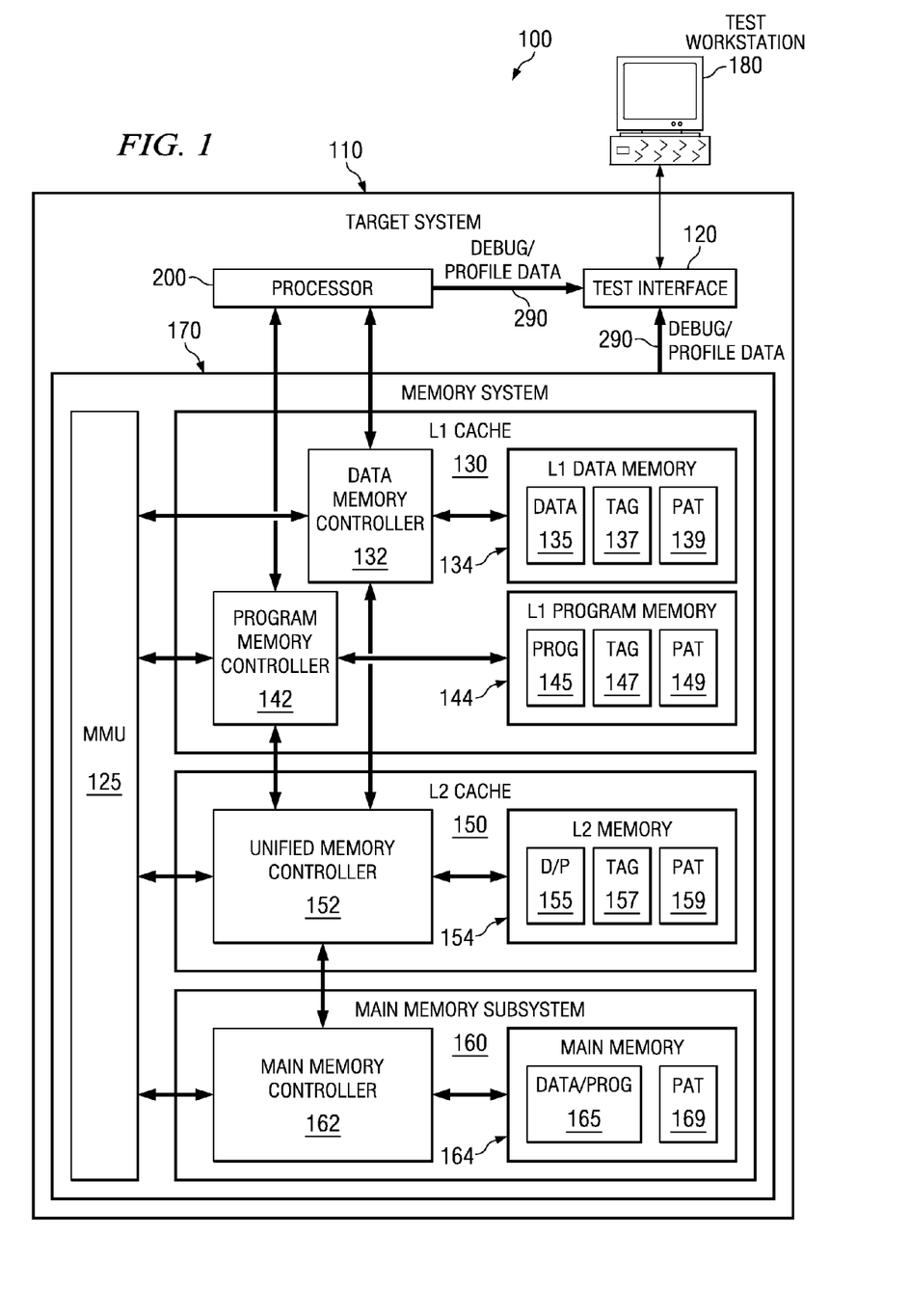
FIG. 1 shows a system for testing and debugging a target system, in accordance with at least some illustrative embodiments.

FIG. 1 shows a system 100 for debugging and profiling a target system 110, constructed in accordance with at least some illustrative embodiments of the invention, which comprises processor 200, memory system 170, and test interface (Test I/F) 120. Processor 200 couples to test interface 120, which couples to both memory system 170 and test workstation 180. Test workstation 180 permits a user to monitor debug and profiling data 290 collected from both processor 200 and memory system 170 of target system 110, and further permits the user to control the testing of target system 110. Debug and profiling data may also be collected from a number of other sources within target system 110, and all such sources are intended to be within the scope of the present disclosure.

Processor 200 also couples to memory system 170, which comprises level 1 cache memory (L1 Cache) 130 (the highest cache level with the fastest memory), level 2 cache memory (L2 Cache) 150 (the lowest cache level with memory slower than the memory of the L1 cache), main memory subsystem 160 (with memory slower than the memory of both the L1 and L2 caches), and memory management unit (MMU) 125. L1 cache 130, which is the first level of a multilevel cached memory system, includes data memory controller 132 and program memory controller 142, which each couple to processor 200. Data memory controller 132 couples to L1 data memory 134, which includes cached data (Data) 135, cached data tag information (Tag) 137, and data page attribute table (PAT) 139. Similarly, program memory controller 142 couples to L1 program memory 144, which includes cached program instructions (Prog) 145, cached instruction tag information (Tag) 147, and program page attribute table (PAT) 149.

Data memory controller 132 and program memory controller 142 each couple to unified memory controller 152, which is part of L2 cache 150. L2 cache 150 also includes L2 memory 154, which also couples to unified memory controller 152. L2 memory 154 includes cached data and program instructions (D/P) 155, cached data and program tag information (Tag) 157, and data and program page attribute table (PAT) 159. Unified memory controller 152 couples to main memory controller 162, which is part of main memory subsystem 160. Main memory subsystem 160 also includes main memory 164, which also couples to main memory controller 162. Main memory 164 includes data and program information 165, as well as data and program page attribute table (PAT) 169. Memory management unit 125 couples to, and interacts with, each of the memory controllers (132, 142, 152, and 162) at each level of memory (L1, L2, and Main).

When processor 200 reads an instruction or data from memory, an attempt is made to first retrieve the instruction or data from L1 cache 130. If the instruction or data is not located within L1 cache 130, an attempt is subsequently made to read the instruction or data from L2 cache 150. If the instruction or data is located in L2 cache 150, L1 cache 130 may be updated to include the instruction or data from L2 cache 150 (making it available in L1 cache 130 for subsequent reads), and processor 200 may proceed with processing the instruction or data. If the instruction or data is not located within L2 cache 150, the instruction or data is read from main memory subsystem 160. L1 cache 130 and L2 cache 150 may be updated to include the instruction or data read.

Processor 200, in accordance with at least some embodiments, is capable of executing code within two different execution modes, supervisor mode and user mode. In supervisor mode, all functions of processor 200 are available to the program executing on the processor. In user mode, the program executing on processor 200 is blocked from executing some instructions and from accessing some control registers within the processor. This prevents an unprivileged program from bypassing the management of hardware by supervisory software. Processor 200 is also capable of operating at two different security levels, a secure level and a non-secure level. Resources (e.g., memory pages) within target system 110 are configured to operate at one of the two security levels, and programs executing while the processor is operating at a non-secure level are blocked from accessing resources configured as secure resources.

Security levels may be defined in a number of different ways depending upon the design of processor 200. For example, in a single-stage processor, the security level reflects the security level of the instruction being executed by the processor. The security level of the instruction in turn depends upon the security level of the resource that stores the instruction (e.g., an instruction stored within a read-only memory that is configured as a secure resource is a secure instruction). Thus, if a single stage processor executes an instruction read from a secure memory, the instruction is a secure instruction and the processor is operating at a secure level.

Alternatively, if processor 200 is a pipelined processor with multiple execution stages operating simultaneously, each stage operates at one of the defined security levels, independently of some or all other stages, Accordingly, the security level of each stage reflects the security level of the instruction being processed by that stage. Thus, if a secure instruction is being processed by an instruction fetch stage while a non-secure instruction is being processed by an instruction decode stage, the instruction fetch stage is operating at a secure level, and the instruction decode stage is operating at a non-secure level. Many alternative ways of defining security levels of a processor or processor stage, applicable to many types of processors, will become apparent to those skilled in the art, and all such definitions and processor types are intended to be within the scope of the present disclosure.

By combining multiple processor execution modes with resource specific security levels, target system 110 can be configured to include "trusted" resources. These resources are configured to operate, execute and/or be accessed while processor 200 is operating in supervisor mode by instructions loaded by the processor from a secure resource. Because the resource is secure, it may only be accessed by trusted code, and if the resource is a modifiable medium (e.g., a flash memory), the contents of the resource (i.e., the trusted code) may only be modified by the trusted code. Thus, for example, target system 100 is configured to initialize processor 200 in a supervisor mode, and to initially load and execute code from a secure region of non-volatile memory (e.g., an electrically erasable programmable read-only memory (EEPROM)).

Trusted code executed upon boot-up of the target system 110 may be part of a basic input and output system (BIOS), or may be the core portion (kernel) of an operating system. In at least some embodiments, the trusted code configures the system for operation, and configures other selected resources as secure resources. By storing the BIOS or kernel code in a secure resource, the code is protected from modification by other programs, even if those programs are executing in supervisor mode. Only trusted code stored in a secure resource, such as the BIOS or kernel code itself, can make modifications to any portion of the trusted code (assuming the device within which the code is stored is writeable). Because trusted code is used to initialize the security configuration of the system before any other code executes, the secure resources of the system are also protected from unauthorized access or other tampering upon boot-up.

As noted above, a page attribute table is maintained within each memory (e.g., L1 data, L1 program, L2, and Main). In accordance with at least some embodiments, each page attribute table has a plurality of entries wherein each entry determines, among other things, the security level of a page of the corresponding memory. Thus, for example, entries within page attribute table 149 determine the security level of memory pages within L1 program memory 144. Further, as instructions or data are updated within a particular cache level, the page attribute table entry (corresponding to the page of memory where the instruction or data is stored) is also updated to reflect the page attribute table entry of the source providing the updated instructions or data.

For example, if an attempt at reading data from L1 cache 130 results in a cache miss, but the data is stored in L2 cache 150, the attribute corresponding to the memory page in L1 cache 130 where the data is stored is updated with the attribute corresponding to the memory page where the data is stored in L2 cache 150. Thus, as instructions or data ripple through the cache memory system, the attributes associated with the memory pages where the instructions or data are stored also ripple through the page attribute tables within each level of cache memory. It should be noted that each of the page attribute tables are each maintained within secure areas of memory to prevent unauthorized access and/or modification of the contents of the page attribute table. Thus, only trusted code and/or secure hardware may modify the contents of the page attribute tables.

Figure 2:
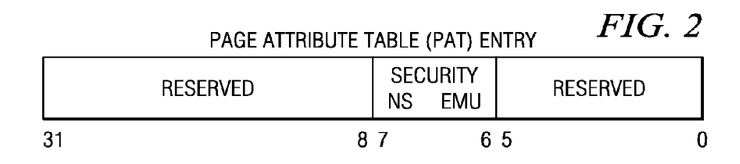
FIG. 2 shows a page attribute table entry, in accordance with at least some illustrative embodiments.

FIG. 2 illustrates an example of how some of the bits of a page attribute table entry may be used to determine the security level of an instruction, and to also control the export of debug and profiling information. The non-secure (NS) bit within the security field of the page attribute table entry shown reflects the security level of the page to which the entry corresponds. Thus, if a program instruction is read from main memory 164, and the corresponding entry within page attribute table 169 indicates that the page is a secure page, the instruction read will be executed by processor 200 at a secure level and will be allowed to access other secure resources. The page attribute table entry shown in FIG. 2 also includes a secure emulation (EMU) bit within the security field. This bit, when combined with the non-secure bit, provides the ability to control the exportation of information when debugging and profiling a trusted applications using test interface 120 (FIG. 1).

Figure 3A:
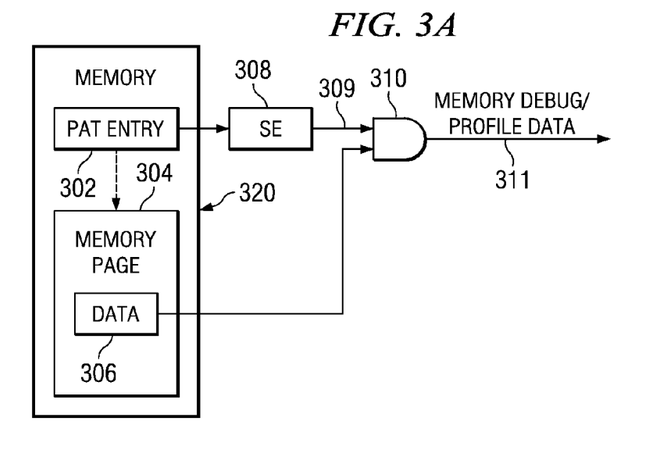
FIG. 3A shows a memory with secure emulation logic, in accordance with at least some illustrative embodiments.

FIG. 3A shows how the export of debug and profiling information from a memory 320 is controlled by the security field bits of a page attribute table (PAT) entry 302. PAT entry 302 is associated with memory page 304, which includes data 306. When data 306 is read from memory page 304, PAT entry 302 provides the security field bits that control whether data 306 is exported as debug and profile data to test workstation 180 (FIG. 1). Memory 320 couples to secure emulation logic 308, which combines the security field bits of PAT entry 302 to generate secure emulation enable signal 309. If the memory page is identified by the non-secure bit as a secure page, data will only be exported if the emulation bit is also asserted. Memory 320 and the output of secure emulation logic 308 both couple to inputs of AND gate 310, allowing secure emulation enable signal 309 to act as a gating signal that enables the export of data 306 as memory debug and profile data 311. This data is forwarded to test interface 120 (FIG. 1) as part of the debug and profiling data 290, which in turn is sent to test workstation 180.

As already noted, in a pipelined architecture, the security level of a given pipeline stage reflects the security level of the instruction being executed by that pipeline stage. In accordance with at least some embodiments, the security level of the instruction being executed is tracked by providing a register for at least some of the pipeline stages which each stores the security field bits of the page attribute table entry corresponding to the instruction being executed. As with memory 320 of FIG. 3A, the exportation of information related to instructions being processed by a pipelined processor stage may also be controlled using the security field bits associated with the instruction.

Figure 3B:
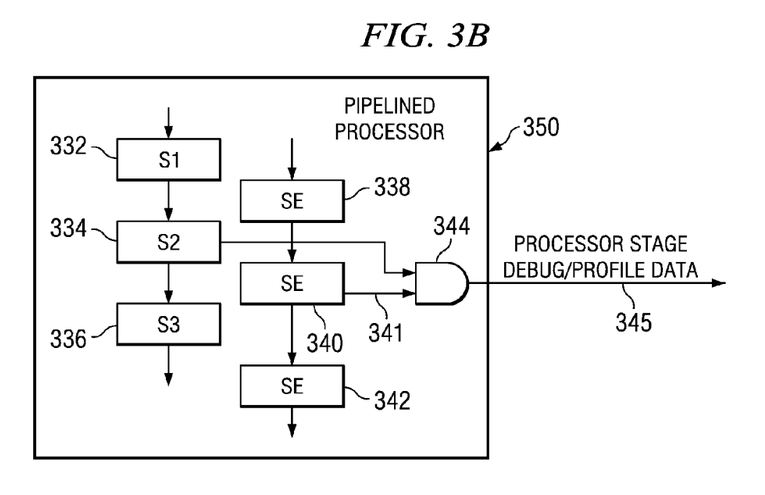
FIG. 3B shows a portion of a pipelined processor with secure emulation logic, in accordance with at least some illustrative embodiments.

FIG. 3B illustrates an example of an embodiment of a section of a pipelined processor 350, which provides secure emulation logic that stores and decodes the security bits of an instruction executing at each pipeline stage. A program instruction and the corresponding security bits enter the pipeline at stage S1 (332) and secure emulation logic (SE) 338 respectively. Both the program instruction and the security bits are synchronously shifted through the pipelined processor 350 until both have been processed by all of the pipeline stages in sequence as indicated by the arrows between stages shown in FIG. 3B. Each of the pipeline stages S1, S2 and S3 (332, 334, and 336) has corresponding secure emulation logic (338, 340, and 342). For example stage S2 (334) has a security designation determined by SE 340. SE 340 stores both the non-secure bit and the secure emulation bit for the instruction executed by stage S2. The bits are combined to generate secure emulation enable signal 341. Processor stage S2 and the output of secure emulation logic 340 both couple to inputs of AND gate 344, allowing secure emulation enable signal 341 to act as a gating signal that enables the export of information related to processor stage 334 as processor stage debug and profile data 345. This data is forwarded to test interface 120 (FIG. 1) as part of the debug and profiling data 290, which in turn is sent to test workstation 180.

Figure 3C:
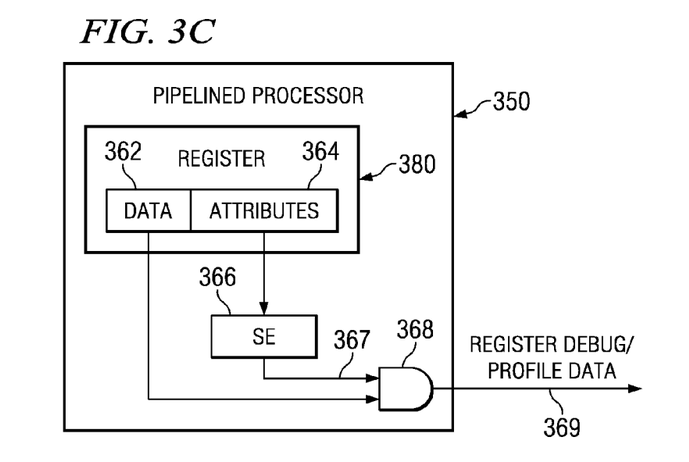
FIG. 3C shows a processor register with secure emulation logic, in accordance with at least some illustrative embodiments.

Similarly, registers within pipelined processor 350 of the illustrative embodiments described also store data and attribute bits. The attribute bits include security field bits that determine the security designation of the data stored within the register, as shown in FIG. 3C. Register 380 holds both register data 362 and an attribute 364. Attribute 364 includes the same non-secure and secure emulation bits described in relation to the page attribute table entry of FIG. 2. Continuing to refer to FIG. 3C, register 380 couples to secure emulation logic 366, which combines the security field bits of attribute 364 to generate secure emulation enable signal 367. If the register contents are identified by the non-secure bit as secure, the register contents will only be exported if the emulation bit is also asserted. Register 380 and the output of secure emulation logic 366 both couple to inputs of AND gate 368, allowing secure emulation enable signal 367 to control the export of data 362 as register debug and profile data 369. This data is forwarded to test interface 120 (FIG. 1) as part of the debug and profiling data 290, which in turn is sent to test workstation 180.

Figure 4A:
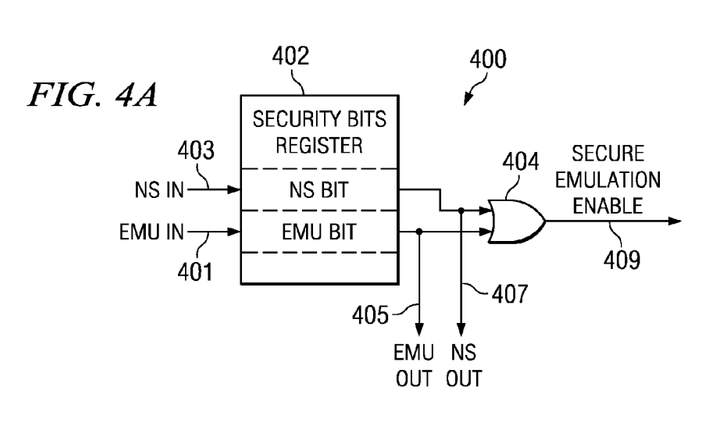
FIG. 4A shows secure emulation logic, in accordance with at least some illustrative embodiments.

The non-secure and secure emulation bits described above are stored and combined as shown in the illustrative embodiment of secure emulation logic 400 of FIG. 4A, which is representative of the SE logic in FIGS. 3A, 3B and 3C. Secure emulation input signal (EMU In) 401 and non-secure input signal (NS In) 403 drive the respective inputs that determine the values of the EMU and NS bits of security bits register 402. These signals may be driven by a number of sources, including, for example, values loaded from memory (e.g., from page attribute table entry 302 of FIG. 3A), or the security bits register of a preceding pipelined processor stage (e.g., the security bits register within SE 338 of FIG. 3B). Referring again to FIG. 4A, the output of each bit of the security bits register 402, secure emulation output signal (EMU Out) 405 and non-secure output signal (NS Out) 407, are provided as the inputs to OR gate 404 (and may also serve as inputs to another SE logic stage, as in the example of FIG. 3B). The output of OR gate 404 (secure emulation stage enable signal 409) is used to gate debug and profile information exported by a data source (e.g., data 306 in FIG. 3A, stage S2 information in FIG. 3B, and register data 362 in FIG. 3C).

Figure 4B:
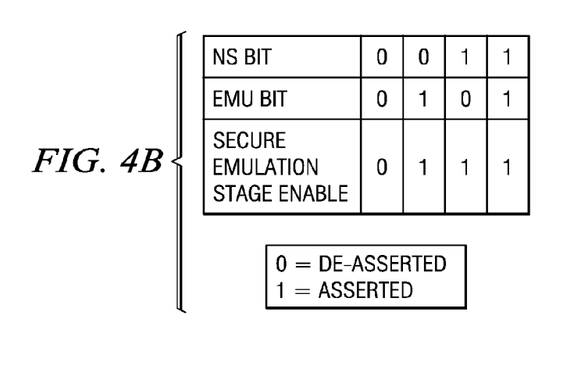
FIG. 4B shows a truth table for the secure emulation logic of FIG. 4A.

As can be seen in logic table shown in FIG. 4B, when the non-secure bit is asserted, the output of the OR gate is asserted regardless of the state of the secure emulation bit. When the non-secure bit is not asserted, the output of the OR gate depends upon the state of the secure emulation bit. For example, referring back to FIG. 3B, if the processor stage S2 (334) is executing a secure instruction (i.e., the non-secure bit is not asserted), and the secure emulation bit is asserted, the output of SE 340 will be asserted. Assertion of the output of SE 340 allows information from stage S2 to be forwarded through AND gate 344 as processor stage debug and profile data signal 345, and to be transmitted as part of debug and profile data 290 (FIG. 1). Debug and profile data 290 is forwarded to test interface 120, and subsequently to workstation 180.

By using a configuration bit to control access to secure debugging and profiling information, trusted applications can be debugged without adding any special code to the program that could alter the behavior of the code being tested. Once debugging is complete, only the boot-up code is altered, and only the value of the secure emulation bits for the pages of memory where trusted applications are stored are changed (and subsequently propagated throughout the system as the contents of the memory pages are loaded into registers and processor stages). Thus, the behavior of the trusted application will remain unaltered after the secure emulation bits are de-asserted. Once the secure emulation bits are de-asserted, access to the trusted application through the test interfaces is blocked, and the trusted application is protected from unauthorized access and observation. Such protection may be necessary, for example, if the trusted application handles encryption and decryption keys stored in secure memory. Such keys should not be accessible outside of a trusted, secure environment.

Figure 5:
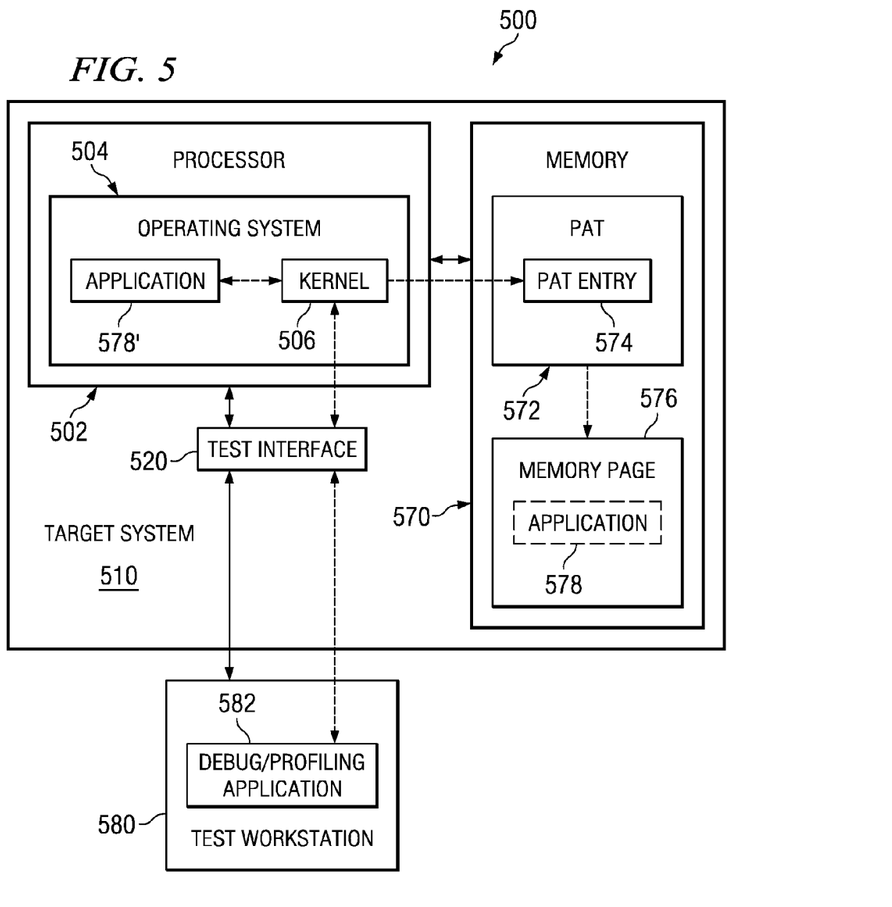
FIG. 5 shows a system for testing and debugging a target system that uses a debug authentication mechanism, in accordance with at least some illustrative embodiments.

The secure emulation configuration of the various secure applications that may be provided with the target system may also be changed after boot-up by a trusted application. For example, a secure kernel within an operating system that is loaded from a trusted resource (as previously described in the context of a system boot) can make such changes, provided that an authentication mechanism exists to confirm that a user or application requesting the change is authorized to do so. FIG. 5 illustrates a system 500 for debugging a target system 510, constructed in accordance with at least some illustrative embodiments, configured to provide such an authentication mechanism.

Target system 510 includes processor 502, which couples to memory 570 and test interface 520. Test interface also couples to test workstation 580, which executes debug and profiling application 582. Operating system 504 includes kernel 506, which executes on processor 502. Target application 578' also executes under operating system 504 on processor 502, and represents the portion of target application 578, resident within memory page 576, that is currently loaded and executing within processor 502. Memory 570 includes page attribute table (PAT) 572, which includes PAT entry 574. PAT entry 574 is associated with memory page 576, which includes target application 578. Although target application 578 is shown in FIG. 5 as contained within a single memory page, other applications may occupy more than one memory page, and all such applications are intended to be within the scope of the present disclosure.

Kernel 506 communicates with both executing target application 578' and with debug and profiling application 582 (via test interface 520). Kernel 506, as a trusted application, has access to page attribute table 572 (stored in a secure area of memory). As a trusted application, kernel 506 is authorized to change the security field bits of PAT entries within page attribute table 572. The ability to alter the security field bits of PAT entries allows secure applications to be debugged in the field, even though the secure emulation bits are de-asserted when the system is first booted. The state of the secure emulation bit within a PAT entry can be toggled by kernel 506 upon request from a user controlling debug and profiling application 582.

For example, a request is sent by debug and profiling application 582 to kernel 506, identifying executing target application 578' as the application targeted by the request. Kernel 506 verifies that target application 578' is executing on processor 502 and forwards the request to executing target application 578'. The request is authenticated by executing target application 578', which notifies kernel 506 of the success or failure of the authentication of the security credentials presented by debug and profiling application 582. If the authentication succeeds, the request to alter the state of the secure emulation bits is honored, and the secure emulation bit of PAT entry 572 (associated with target application 578) is updated to reflect the state requested.

Figure 6:
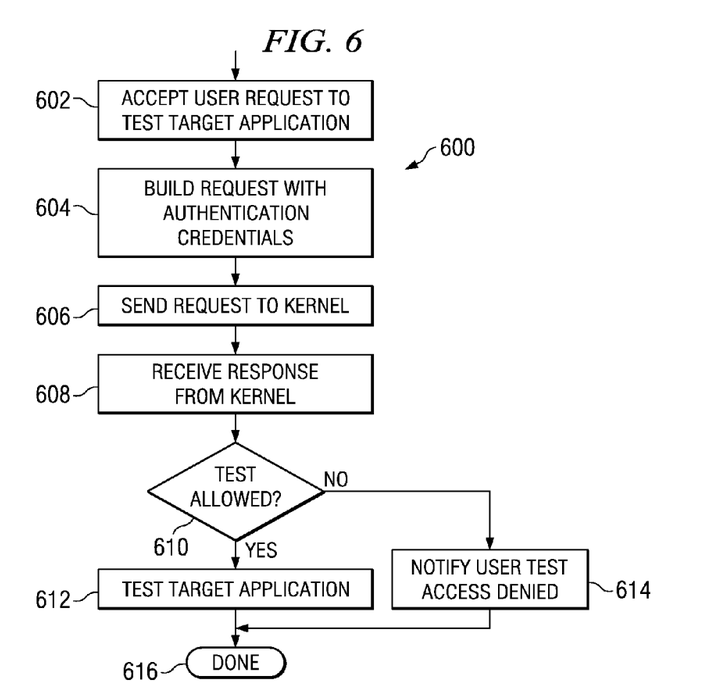
FIG. 6 shows a method for requesting secure testing of a target application, in accordance with at least some illustrative embodiments.

FIG. 6 illustrates a method 600 for requesting secure testing of a target application executing on a target system, in accordance with at least some illustrative embodiments. The debug and profiling application accepts a request from a user for secure testing of an application (block 602). The user generates the request by operating a test workstation (e.g., test workstation 580 of FIG. 5) on which the debug and profiling application executes. Continuing to refer to FIG. 6, a request is built (block 604) that includes information that identifies the target application to be tested, as well as authentication credentials that can be verified by the target application to be tested (e.g., a digital signature generated by a private key provided by the user). The request is sent by the debug and profiling application to the kernel executing on the target system that also executes the target application (block 606). The debug and profiling application receives a response to the request from the kernel (block 608) and checks to see if the request was granted (block 610). If the request is granted, the debug and profiling application is given test access to the target application and can begin to receive debug and profiling test data from the target application, and the user may begin to test the target application (block 612). If the request is denied, the user is notified of the denial (block 614). The method 600 completes when the user ends the debug and profile session for the target application, or after the user is notified that the request was denied (block 616).

Figure 7:
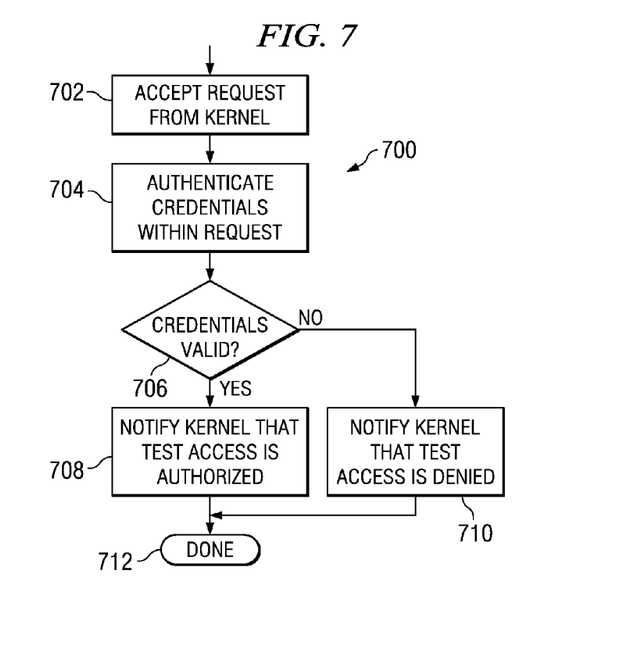
FIG. 7 shows a method for authenticating within a target application a request for secure testing, in accordance with at least some illustrative embodiments.

FIG. 7 illustrates a method 700 for authenticating within a target application a request for secure testing of the target application, in accordance with at least some illustrative embodiments. The target application receives a request for secure testing of the target application from the kernel executing on the same target system as the target application (block 702). The target application authenticates credentials provided within the request to determine if the request originates from an authorized user (block 704). This may be done, for example, by applying a public decryption key, embedded within the application, to a digital signature included within the request to verify the authorization of the requestor. If the credentials are valid (block 706), the target application notifies the kernel that secure testing of the target application is allowed (block 708), and the method completes (block 712). If the credentials are not valid (block 706) the kernel is notified of the refusal (block 710) and the method completes (block 712).

Figure 8:
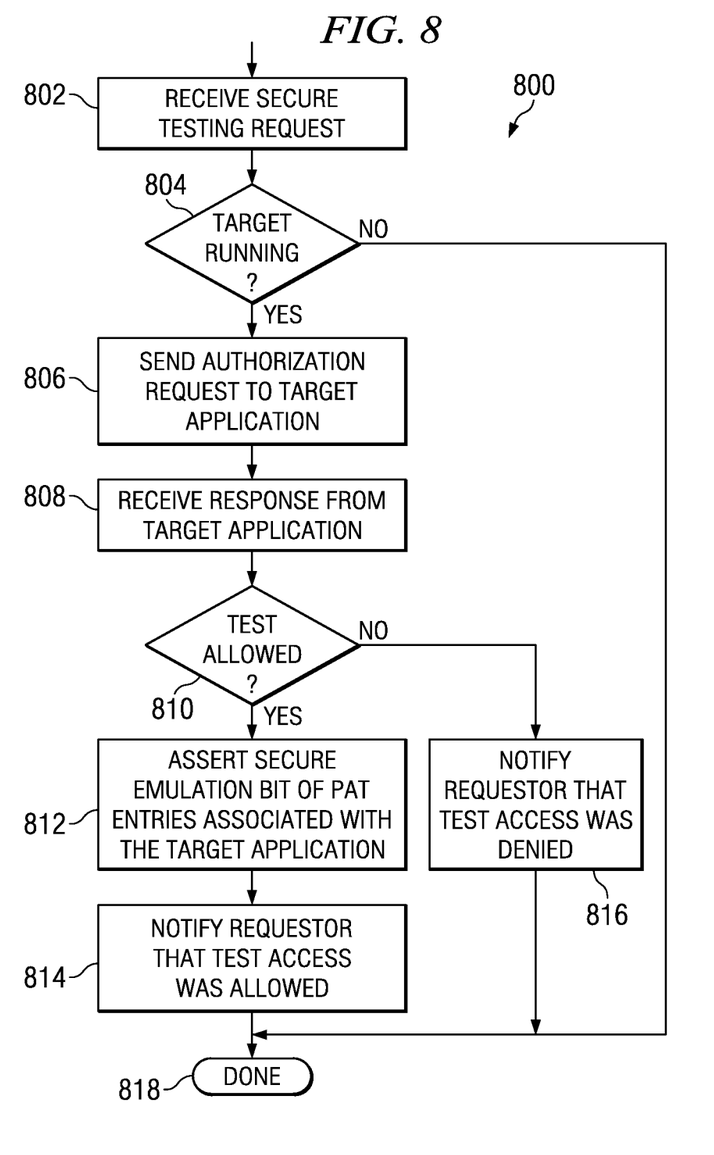
FIG. 8 shows a method for processing a request for secure testing of a target application, and for acting on an authorized request, in accordance with at least some illustrative embodiments.

FIG. 8 illustrates a method 800 for receiving and processing a request for secure testing of a target application, and for acting on an authorized request, in accordance with at least some illustrative embodiments. The kernel executing on the target system receives a request for secure testing of a target application executing on the same target system as the kernel (block 802). The kernel checks to confirm that the target application identified in the request is actually executing (block 804), and the method ends if the application is not executing (block 820). If the target application is executing (block 804), the kernel forwards the received request to the target application for authorization (block 806). Once the kernel receives a response to the forwarded request (block 808), the response is checked to determine if the request was authorized (block 810). If the request is not authorized by the target application, the kernel sends a message back to the originator of the request indicating that the secure testing request was denied (block 816), and the method ends (block 818). If the request is authorized by the target application, the kernel asserts the secure emulation bit of each page attribute table entry that is associated with a memory page in which the target application is loaded (block 812), thus enabling the export of debug and profiling data associated with the target application from the target system. The originator of the request is notified that the request was granted (block 814) and the method ends (block 818).

The combination of the above-described methods allows individual secure applications to provide a mechanism for providing debugging and profiling information after delivery of a system (hardware and software) and deployment in the field. Further, a target system can include a collection of software applications from different vendors, with separate authentication information embedded within each vendor's software application. Since each vendor can embed their own authentication key within their respective applications, each vendor is limited to debugging their own application, and the target applications included by other vendors are thus not exposed by the first vendor's testing. Each vendor may thus allow secure testing of their target applications by an authorized user, without that authorization extending to a user authorized to debug another vendor's target application.

The above disclosure is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
   A. processor circuitry having data leads and debug/profile data leads;
   B. test interface circuitry having processor debug/profile leads coupled to the debug/profile leads of the processor circuitry and having memory debug/profile leads;

C. memory circuitry having data leads coupled with the data leads of the processor circuitry and having debug/profile data leads coupled with the memory debug/profile leads, the memory circuitry including a data portion and a data page attribute table portion for the data portion, the page attribute table portion including a non-secure bit and an emulation bit;

D. secure emulation logic having an input coupled to the non-secure bit, an input coupled to the emulation bit and a secure emulation enable output; and E. gating circuitry having a first input coupled with the a secure emulation enable output, a second input coupled with the data portion, and an output coupled with the memory debug/profile leads;

the memory circuitry including first cache memory having a data portion for cached data, cached data tag information, and a cached data page attribute table for the cached data, and a program portion for cached program instructions, cached program tag information, and a cached program page attribute table for the cached program instructions.

2. The system of claim 1 including second cache memory coupled with the first cache memory, the second cache memory having a data portion for cached data, cached data tag information, and a cached data page attribute table for the cached data, and a program portion for cached program instructions, cached program tag information, and a cached program page attribute table for the cached program instructions.

3. The system of claim 2 in which the memory circuitry includes main memory coupled with the second cache memory, the main memory having a data portion for cached data and a cached data page attribute table for the cached data, and a program portion for cached program instructions and a cached program page attribute table for the cached program instructions.

* * * * *